United States Patent [19]

Videon

[11] 3,743,041
[45] July 3, 1973

[54] TRANSDUCER BEAM ASSEMBLY
[76] Inventor: John A. Videon, 1336 S.E. 38th Place, Gainesville, Fla. 32601
[22] Filed: Sept. 22, 1972
[21] Appl. No.: 291,327

[52] U.S. Cl.............. 177/136, 177/211, 73/141 A
[51] Int. Cl............................................ G01g 19/08
[58] Field of Search ..........................177/136–138, 211; 73/141 A

[56] References Cited
UNITED STATES PATENTS
2,813,709  11/1957  Brier................................. 177/137
3,322,220  5/1967  Bash.................................. 177/137
3,661,220  5/1972  Harris............................ 177/211 X

*Primary Examiner*—George H. Miller, Jr.
*Attorney*—Harold B. Hood, George A. Gust et al.

[57] ABSTRACT

For use on a vehicle which includes an axle and a spring, a load-measuring transducer assembly comprising first and second support members secured to the spring and the axle of a vehicle, respectively, in vertically spaced apart relationship, and an elongated beam having opposite ends disposed horizontally therebetween. A first fulcrum means is provided for pivotably, compressibly supporting the beam at the ends thereof in spaced apart relationship to the first member. A second fulcrum means for applying a flexing force to the beam in proportion to the load on the axle pivotably and compressibly supports the beam inwardly of the ends thereof in spaced apart relationship to the second support member. First and second coupling means pivotably couple the ends of the beam to the first member and the beam to the second member adjacent the second fulcrum means, respectively. A strain measuring means for measuring the flexing strain of the beam is mounted thereon.

11 Claims, 7 Drawing Figures

PATENTED JUL 3 1973

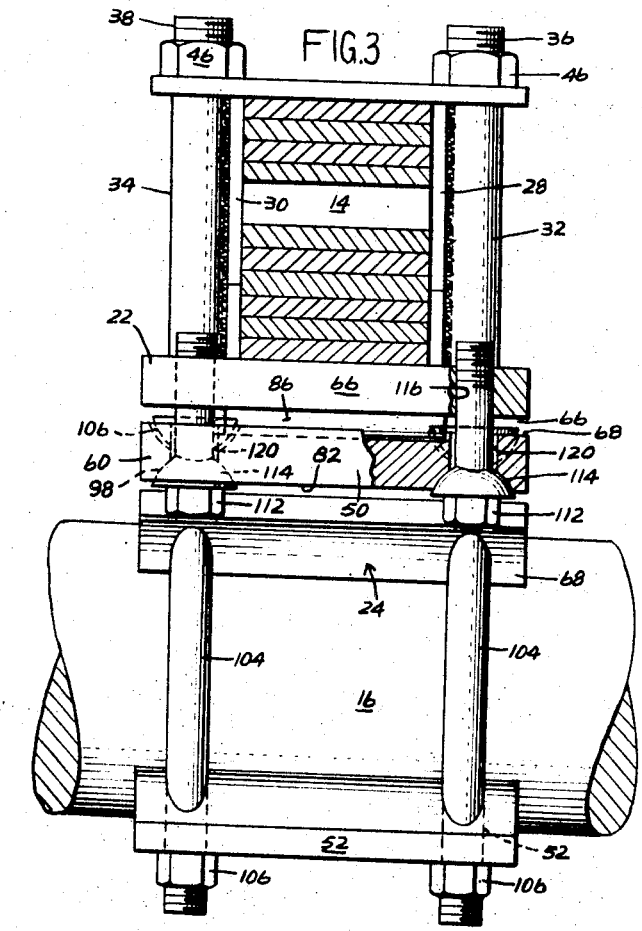
FIG.3
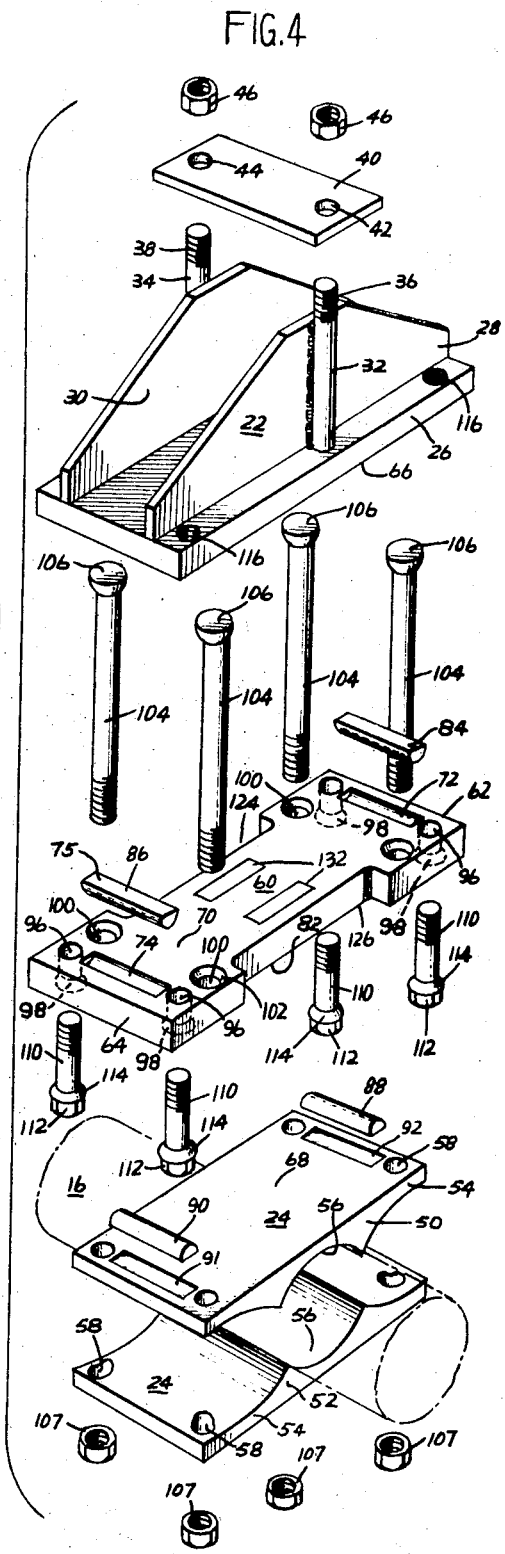
FIG.4
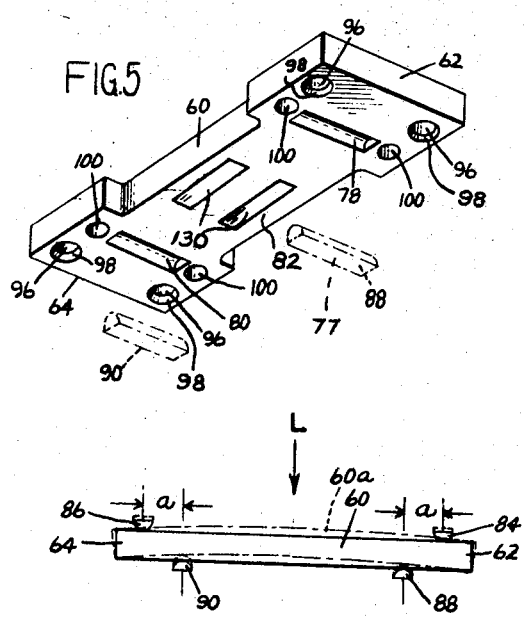
FIG.5
FIG.7

3,743,041

TRANSDUCER BEAM ASSEMBLY

BACKGROUND OF THE INVENTION

1. Field of the Invention

The present invention relates to load-measuring devices and in particular to a beam-type transducer assembly adapted for installation between the spring and axle of a vehicle such as a truck or semi-trailer for measuring the load on the axle.

2. DESCRIPTION OF THE PRIOR ART

Trucks such as large semi-trailer rigs are subject to numerous regulations regarding weight for the purpose of limiting maximum weight, taxation, and the like. Further, to achieve maximum operating efficiencies, such trucks should be loaded as fully as allowable. Correspondingly, facilities must be provided for measuring the gross weight of the vehicle. One method of weighing such vehicles is to provide a large scale capable of supporting the entire truck or portions thereof. Such scales are very expensive and special facilities must be provided for their installation. Further, such a scale, by its nature, is only capable of measuring the weight of a single vehicle at a time whereby, vehicles must frequently wait in line at available "weigh stations."

As an alternative, systems commonly referred to as "on board" weighing systems have been proposed. Such weighing systems typically include a device which is coupled to the axle of the vehicle, the device providing a signal or other indication indicative of a load on the individual axles. Such a system is disclosed in my copending patent application, Ser. No. 803,285, filed Feb. 28, 1969.

SUMMARY OF THE INVENTION

The present invention is an improvement in this last-mentioned type of system. Broadly, the transducer beam assembly of the present invention comprises first and second support members which are secured in vertically spaced apart relationship to the spring and the axle, respectively, of a vehicle such as a semi-trailer rig. An elongated simple beam having opposite ends is positioned between the support members. A fulcrum means pivotably supports the beams at the ends thereof in spaced apart relationship to the first member and a second fulcrum means pivotably supports the beam inwardly of its ends in spaced apart relationship to the second member, the second fulcrum means applying a flexing force to the beam in proportion to the load on the axle. First and second coupling means are provided for pivotably coupling the beam at the ends thereof and at points adjacent the second fulcrum means to the first and second support members, respectively. A transducer device is coupled to the beam for providing an electrical signal proportional to the deformation thereof.

It is therefore an object of the invention to provide an improved transducer beam assembly for use in an "on-board" weighing system.

It is another object of the invention to provide such an assembly which provides substantially linear indication of load.

It is still another object of the invention to provide a transducer assembly which is also a load-carrying member in a vehicle suspension.

It is yet another object of the invention to provide such an assembly which utilizes low friction supports and fulcrum pins to effect low friction operation.

It is an object of the invention to provide a transducer assembly wherein the load-measuring element includes a simple beam.

It is yet another object of the invention to provide such an assembly which is exceptionally rugged and resistant to shock.

It is still another object of the invention to provide a transducer assembly which is substantially unaffected by changes in the position and tire pressures of the vehicle and uneven road surfaces and the like.

Another object of the invention is to provide a transducer assembly which provides certifiable load measurements.

Still another object of the invention is to provide such an assembly which can be used in multiple groups to provide a direct reading of load on individual axles and of the total vehicle weight.

Yet another object of the invention is to provide a transducer assebmly which provides direct reading of the weight at a remote location such as the cab of the vehicle.

BRIEF DESCRIPTION OF THE DRAWINGS

The above-mentioned and other features and objects of this invention and the manner of attaining them will become more apparent and the invention itself will best understood by reference to the following description of an embodiment of the invention taken in conjunction with the accompanying drawings, wherein:

FIG. 3 is an end plan view of the transducer assembly partially cut away to show details of the coupling means;

FIG. 4 is an exploded perspective view of the transducer assembly;

FIG. 5 is a perspective view of the beam element of the transducer assembly;

FIG. 7 is a diagram useful in explaining the operation of the transducer assembly.

DESCRIPTION OF THE PREFERRED EMBODIMENT

Figure 1:
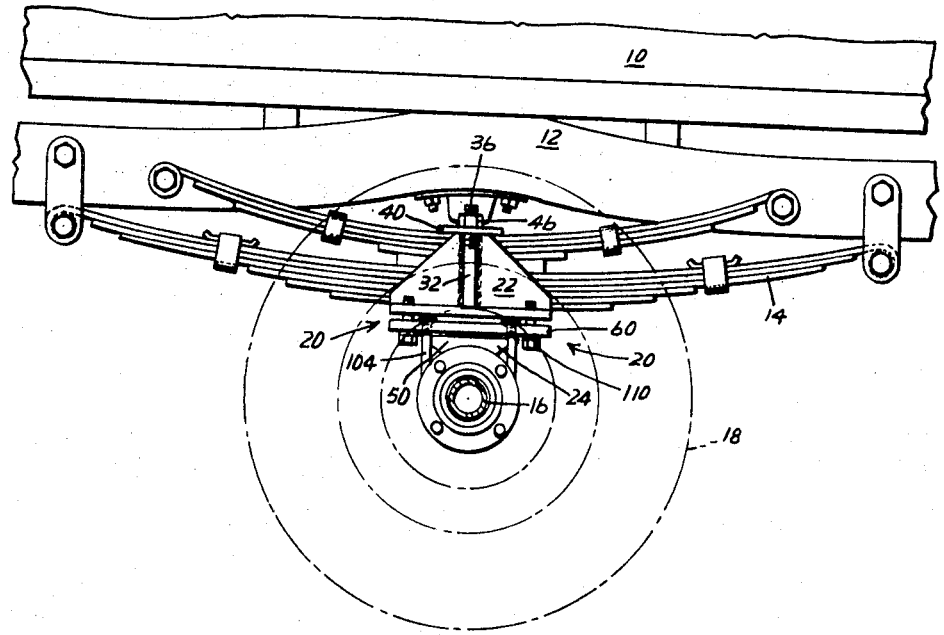
FIG. 1 is a fragmentary side plan view of a vehicle showing the spring and axle thereof with the transducer assembly of the present invention installed therewith.

Referring now to the drawings there is shown in FIG. 1 a portion of a vehicle 10 which includes a supporting frame 12, springs 14, axle 16, and a wheel and tire 18. Transducer beam assembly 20 is mounted between springs 14 and axle 16.

Transducer assembly 20 includes first and second support members 22, 24, which are fixedly secured to the spring 14 and axle 16, respectively. Support member 22 includes a rectangular base plate 26 of substantial thickness having secured thereto, as by welding, two upwardly (as viewed in the drawings) reinforcing walls 28, 30. Walls 28, 30 are tapered adjacent their ends as shown and are disposed in parallel relationship and laterally spaced apart by dimension which permits spring 14 to be engageably received therebetween. A pair of threaded members 32, 34 are welded to the outwardly disposed surfaces of walls 28, 30 with the distal ends 36, 38 thereof extending upwardly of walls 28, 30. A rectangular clamping plate 40 is provided, plate 40 having a pair of holes 42, 44 at the opposite ends thereof, holes 42, 44 dimensioned and spaced to receive therethrough members 36, 38. Threaded fasteners 46 are received on threaded members 36, 38 to thereby positively clamp support member 22 to the spring 14.

Figure 2:
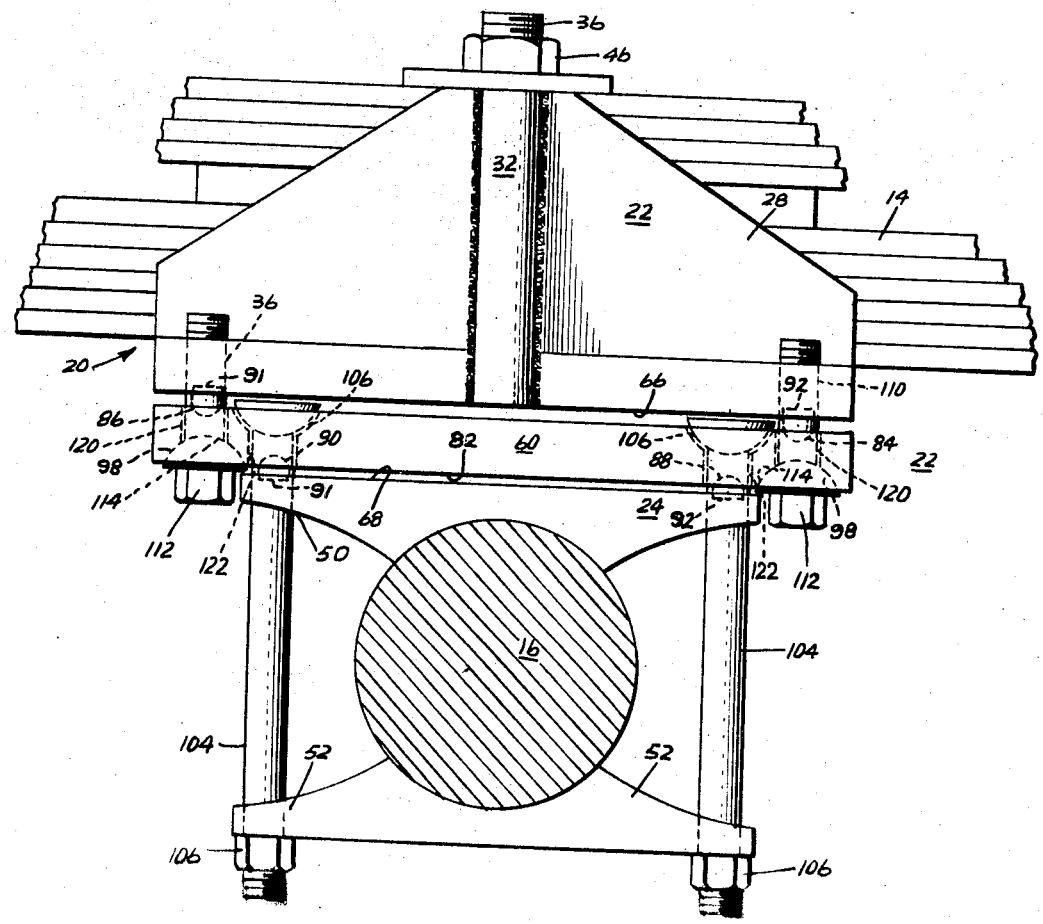
FIG. 2 is a side plan view of the transducer assembly.

Second support member 24 includes upper and lower members 50, 52 (FIGS. 2 and 3). Each of members 50, 52 has arcuately tapered ends as at 54 and an arcuate recess 56 (FIG. 4) adjacent the central portion thereof proportioned to engage the outer surface of axle 16. Holes 58 are provided adjacent each corner of member 52, 54 with respective vertically adjacent (as viewed in the drawings) ones of the holes in members 52 and 54, respectively, being disposed in axial alignment.

As best seen in FIGS. 4 and 5, an elastically bendable beam 60 having opposite ends 62, 64 is positioned between support members 22, 24 in parallel, spaced-apart relationship to the facing surfaces 66, 68 thereof, respectively. In the upper surface 70 of beam 60 adjacent ends 62, 64 are formed elongated, arcuate recesses 72, 74, respectively, recesses 72, 74 extending laterally of the ends 62, 64. A second pair of elongated, arcuate recesses 78, 80 are formed in the downwardly facing (as viewed in the drawings) surface 82 of beam 60, recesses 78, 80, being adjacent the ends 62, 64 and inwardly of recesses 72, 74.

Fulcrum pins 84, 86 each have a part-cylindrical cross-section and a flat surface 75 and are received with their arcuate surfaces in sliding engagement with recesses 72, 74, respectively, and surfaces 75 abuttingly engage surface 66.

A second pair of fulcrum pins 88, 90 also having arcuate cross-sections are received in recesses 78, 80 with their arcuate surfaces in sliding engagement therewith and with their flat surfaces 77 in abutting engagement with surface 68.

Preferably, surfaces 66, 68 are provided with rectangular recesses as at 91, 92 which engageably receive pins 84 through 90 to prevent movement thereof.

A plurality of cylindrical holes 96 are formed, one each, adjacent each corner of beam 60, holes 96 being aligned with the axes of recesses 72, 74. The downward (as viewed in the drawings) ends of holes 96 are provided with an enlarged, spherical shoulder as at 98 at the ends thereof proximal to surface 82. A second plurality of cylindrical holes 100 are formed in beam 60 adjacent each end of recesses 78, 80 and in alignment therewith. The ends of holes 100 nearest surface 70 are again provided with a spherical enlargement as at 102. A plurality of elongated, threaded members 104, each of which is provided with a hemispherical head 106 as shown are slidably received through holes 100 and 58 such that hemispherical heads 106 pivotably engage complementary shoulders 102. Members 104 are secured by means of nuts 107. It will be observed that members 104 and nuts 107 provide a means for positively coupling the beam 60 to support member 24.

A second plurality of threaded fasteners 110 are provided, each having a hexagonal head 112 and each head 112 in turn having a hemispherical shoulder 114 as shown. Members 110 are slidably received through holes 96 and threadingly engage a plurality of threaded holes 116 adjacent the corners of support members 22 in registry with holes 96. It will be observed that members 110 positively couple beam 60 to support member 22.

As best seen in FIGS. 2 and 3, holes 96 and 100 have a diameter larger than the diameters of members 104 and 110 thereby providing clearances therebetween as at 120, 122 for a reason to be explained below. It will also be observed in FIGS. 4 and 5 that beam 60 has elongated notches 124, 126 in its lateral edges whereby beam 60 has a smaller cross-section through its central portion. This narrower cross-section effects a beam which, when subjected to bending stress, will exhibit more bending strain adjacent its center portion than at its ends.

Referring now to FIG. 7, there is shown diagrammatically the effect on the beam 60 of a load carried by the axle 16. The load "L" bears downwardly on support member 22 (not shown in FIG. 7 for clarity) and is supported by the ends 62, 64 of beam 60 via pins 84, 86. Beam 60 is in turn supported on axle 16 and support member 24 via pins 88, 90. Because pins 88, 90 are disposed inwardly of pins 84, 86 by a moment arm of length $a$ the load "L" produces a bending moment on the beam 60 causing the beam 60 to bend as indicated by dashed lines 60a. Because pins 88, 90 and 84, 86 are cylindrical and are supported within cylindrical recesses 78, 80, 72, and 74, the length of the moment arms $a$ remains substantially constant as beam 60 bends. Further, as the beam 60 bends, the clearances 120, 122 between members 104 and 110, respectively, enable the beam 60 to bend without imparting any bending moment to the members 104, 110. Rather, the beam 60 pivots about the spherical heads 106 and 114, respectively. Further, because the beam 60 is a simple beam, the stress therein is substantially linear for small deflections thereof. Correspondingly, the load "L" produces simple bending of beam 60 which is substantially linear and wherein the only errors which occur result from friction between the spherical heads 106, 114 of members 104, 110, respectively, and the pins 88, 90, and 84, 86 with their respective recesses, these frictional forces being relatively insignificant in comparison to the bending moment caused by load "L" on the beam 60.

Figure 6:
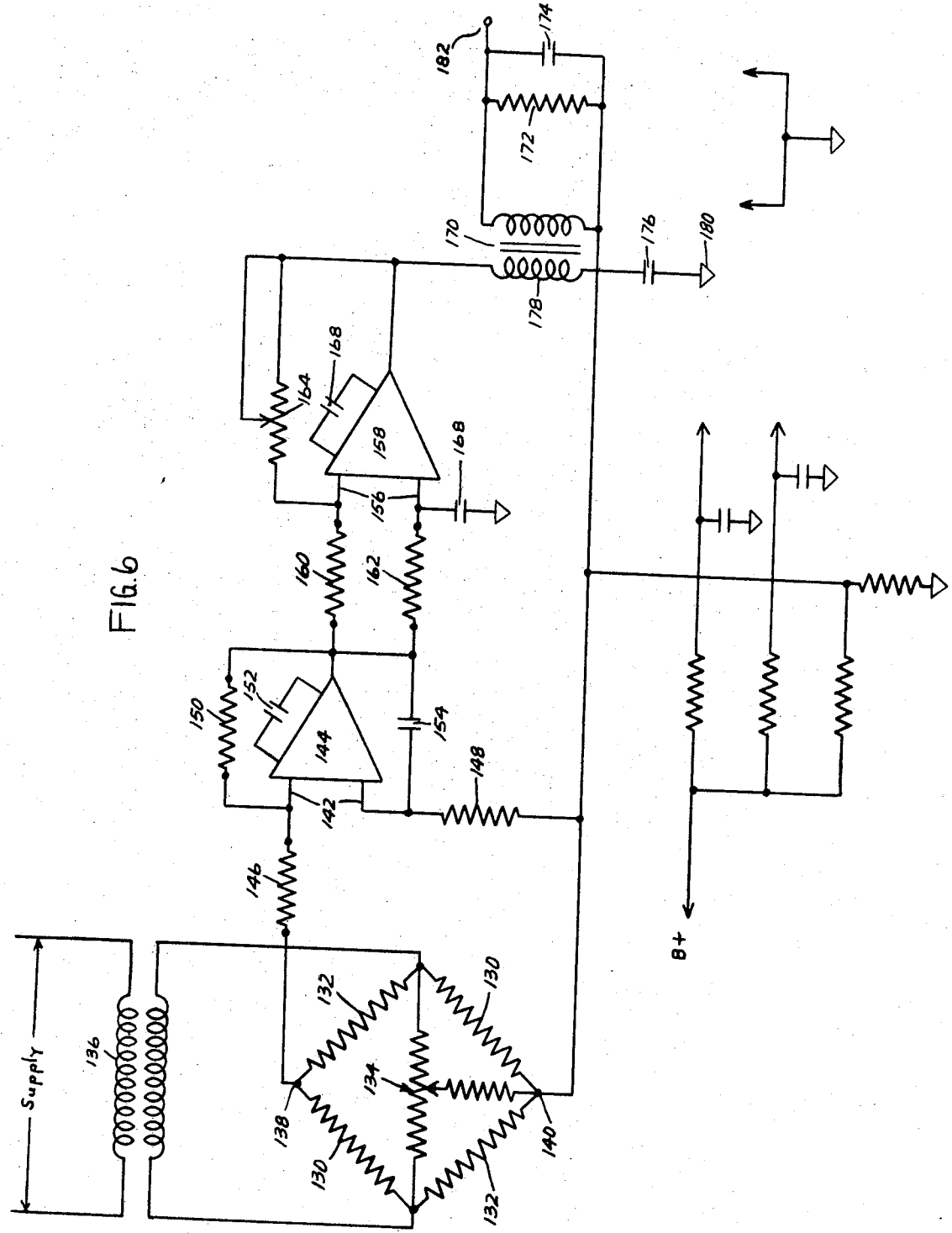
FIG. 6 is an electrical schematic of a typical electrical circuit for use with the transducer assembly of the present invention.

Referring now to FIG. 6, there is illustrated an electrical circuit which may be used in conjunction with the transducer beam assembly above described to provide a means for measuring the strain or bending movement of the beam 60. A plurality of conventional strain gauges 130, 132 are adhered to surfaces 70, 82 of beam 60 and adjacent the center thereof in conventional manner, as shown in FIGS. 4 and 5. Gauges 130, 132 are arranged in a bridge circuit, the bridge circuit including a balancing network 134 and being coupled to a source of alternating operating potential (not shown) via a coupling transformer 136. The output from the strain gauges appearing at terminals 138, 140 is applied to the input terminals 142 of a linear amplifier 144 via resistors 146, 148. Amplifier 144 is provided with conventional feedback resistor 150 and capacitors 152, 154. The output from amplifier 144 is in turn applied to the input terminals 156 of a second linear amplifier 158 via load resistors 160, 162. Amplifier 158 is provided with a variable feedback resistance 164 and capacitors 166, 168 in conventional manner. The output signal from amplifier 158 is applied via a transformer 170 to an output load including resistor 172 and capacitor 174, a suitable filter capacitor 176 being coupled between the transformer 170 input winding 178 and ground of reference potential 180. The output signal from the circuit at terminal 182 can be applied to a conventional digital or analog meter (not shown). Additional transducer beam assemblies may be mounted to each of the axles of a vehicle, each of the additional units being of identical structure to that above described. The output signals from the transducers of each of the assemblies can be summed via a conventional summing network (not shown) with the "readout" at the meter or the like (not shown) being the sum of the loads on each of the axles and therefore equal to the entire load on the vehicle. The circuit of FIG. 6 is shown by way of example only, it being obvious that any suitable transducer circuit using resistance strain gauges or other available strain-indicating devices may be used if lieu thereof.

It will be seen that the transducer assembly of the present invention provides an exceptionally rugged device for measuring the load on the individual axles of a vehicle. The assembly can be mounted between the axle and spring of such a vehicle without any need to weld, cut, or otherwise modify the vehicle. The sensitivity of the gauge can be easily altered to provide an assembly having different load ranges by simply changing the dimension a between the two fulcrum means, and by varying the thickness and width dimensions of the beam 60. The beam 60, itself, is a simple beam with substantially all of the bending thereof occurring between the second fulcrum means whereby, for small deflections, the strain occurring therein is directly proportional to the load on the vehicle.

The transducer assembly can be used in groups with one assembly installed between the spring and the axle adjacent each wheel of the vehicle without any modification of the assembly, the total weight of the vehicle being the simple sum of the loads on each assembly. The assembly is highly resistant to shock and, by reason of the arcuate fulcrum pins and pivot joints, is virtually unaffected by changes in the tire pressure, by reason of the vehicle resting on uneven terrain, and the like.

While there have been described above the principles of this invention in connection with specific apparatus, it is to be clearly understood that this description is made only by way of example and not as a limitation to the scope of the invention.

What is claimed is:

1. For use on a vehicle which includes an axle and a spring, a load-measuring transducer assembly comprising first and second support members secured to the spring and the axle, respectively, of such a vehicle in vertically spaced apart relationship, an elongated beam having opposite ends, first fulcrum means for pivotably and compressibly supporting said beam at said ends thereof in spaced apart relationship adjacent opposite ends of said first member, second fulcrum means pivotably and compressibly supporting said beam inwardly of said ends and in spaced apart relationship adjacent opposite end of said second support member for applying a bending force to said beam in proportion to the load on said axle, first coupling means for coupling said beam ends to said first member for pivotal movement about a first axis extending laterally of said beam through said first fulcrum means, second coupling means for coupling said beam to said second member for pivotal movement about an axis extending laterally of said beam through said second fulcrum means, and means coupled to said beam for measuring the strain thereof.

2. The assembly of claim 1 wherein said first fulcrum means includes a first pair of elongated pins of part-cylindrical cross-section and a recess extending laterally of said beam adjacent each of said ends, each of said first pair of pins being partially received in and slidably engaging a respective one of said recesses, said second fulcrum means including a second pair of elongated pins of part-cylindrical cross-section and a second pair of recesses in said beam, said second recesses extending parallel to said first recesses and being disposed inwardly thereof by a predetermined dimension, each of said second pair of pins being partially received in and slidably engaging a respective one of said second pair of recesses, the surfaces of said first and second fulcrum pins opposite said recesses abuttingly engaging the lower and upper surfaces, respectively, of said first and second support members.

3. The assembly of claim 2 wherein said pins each have a flat surface disposed diametrically opposite said recesses, said first and second support members including recesses therein disposed in vertical alignment with said first and second recesses, respectively, and complementary to that portion of the surface of said pins including said flat surface, said first and second pins being partially received in respective ones of said recesses with the flat surfaces thereof in abutting engagement with said first and second support members.

4. The assembly of claim 1 wherein said first coupling means includes a pair of sockets in said beam disposed in alignment with each of said first axes, a plurality of first coupling members each including a socket-engaging portion, each said portion being pivotally received in a respective one of said sockets, each said first coupling member being fixedly secured to said first support member, said second coupling means including a pair of sockets in said beam disposed in alignment with each of said second axes, a plurality of second coupling members each including a socket-engaging portion, each of said last mentioned portions pivotally engaging a respective one of said last mentioned sockets, each said second coupling member being fixedly secured to said second support member.

5. The assembly of claim 4 wherein said first sockets are hemispherical recesses in the surface of said beam distal said first member, there being a hole communicating between each of said hemispherical recesses and the surface of said beam proximal to said first member, each said coupling member being elongated and including a shaft portion and a head portion, said head portion having a hemispherical surface proximal to said shaft portion and complementary to said hemispherical recess, said second sockets each including a hemispherical recess in the surface of said beam distal said second member, there being other holes communicating between each of said second hemispherical recesses and the surface of said beam proximal said second member, said second coupling members being elongated and including a shaft portion and a head portion, said head portion having a hemispherical surface proximal to said shaft portion and complementary to said second hemispherical recess, said shaft portions extending through said last mentioned holes and being fixedly secured at the distal ends thereof to said second member.

6. The assembly of claim 5 wherein all of said holes and said shaft portions are cylindrical, said holes having a diameter greater than the diameter of said shaft portions, whereby, when said beam pivots about said sockets, said shaft portions move freely within said holes.

7. The assembly of claim 6 wherein said first support member includes a rigid base plate and a pair of side walls fixedly secured thereto and extending vertically upwardly therefrom in parallel, spaced-apart relationship, the lateral spacing of said walls being dimensioned to engageably receive said spring therebetween, and means for clamping said first spring to said support member, said base plate and said beam extending generally horizontally in parallel, spaced-apart relationship.

8. The assembly of claim 7 wherein said second support member includes an upper and a lower member, said first and second members each having an arcuate recess formed therein adjacent the centers thereof, said axle being engageably received between said first and second members within said arcuate recesses.

9. The assembly of claim 8 wherein said first and second coupling members are elongated, the ends thereof distal said hemispherical portions being threaded, said first coupling members extending vertically upwardly through said first mentioned cylindrical holes, said first support member including a threaded hole adjacent each corner thereof in vertical registry with said first mentioned cylindrical holes, said threaded ends of said first coupling members being threadingly engaged therewith, said second coupling members being received vertically downwardly through said other holes, said first and second members having a cylindrical hole adjacent each corner thereof in vertical registry with said other cylindrical holes, said second coupling members being slidably received therethrough, the distal ends of said second coupling members being threaded, a nut threadingly received on the end of each of said other cylindrical members, whereby, said axle is clampingly engaged therebetween.

10. The assembly of claim 9 wherein there are two of said first coupling elements and two of said second coupling elements adjacent each end of said beam.

11. The assembly of claim 10 wherein said transducer means includes resistance strain gauges mounted on said beam and further comprising means coupled to said strain gauges for generating an electrical signal proportional to the change in resistance of said strain gauges.

* * * * *

UNITED STATES PATENT OFFICE
CERTIFICATE OF CORRECTION

Patent No. 3,743,041                                Dated July 3, 1973

Inventor(s) John A. Videon

It is certified that error appears in the above-identified patent and that said Letters Patent are hereby corrected as shown below:

Col. 2, line 19, change "assebmly" to -- assembly --,

Col. 4, line 66, change "of" to -- or --.

Col. 5, line 57, change "end" to -- ends --.

Signed and sealed this 22nd day of January 1974.

(SEAL)
Attest:

EDWARD M. FLETCHER, JR.          RENE D. TEGTMEYER
Attesting Officer                 Acting Commissioner of Patents